United States Patent
Hosoe et al.

(10) Patent No.: US 9,494,239 B2
(45) Date of Patent: Nov. 15, 2016

(54) SLIDING PARTS

(75) Inventors: Takeshi Hosoe, Tokyo (JP); Hideyuki Inoue, Tokyo (JP)

(73) Assignee: Eagle Industry Co., Ltd. (JP)

( * ) Notice: Subject to any disclaimer, the term of this patent is extended or adjusted under 35 U.S.C. 154(b) by 62 days.

(21) Appl. No.: 14/237,127

(22) PCT Filed: Aug. 13, 2012

(86) PCT No.: PCT/JP2012/070644
§ 371 (c)(1),
(2), (4) Date: Feb. 4, 2014

(87) PCT Pub. No.: WO2013/031530
PCT Pub. Date: Mar. 7, 2013

(65) Prior Publication Data
US 2014/0167362 A1    Jun. 19, 2014

(30) Foreign Application Priority Data
Sep. 3, 2011  (JP) .................................. 2011-192171

(51) Int. Cl.
F16J 15/34        (2006.01)
F16J 15/32        (2016.01)

(52) U.S. Cl.
CPC ........... *F16J 15/3244* (2013.01); *F16J 15/342* (2013.01); *F16J 15/3412* (2013.01);
(Continued)

(58) Field of Classification Search
CPC ...................... F16J 15/34; F16J 15/3404; F16J 15/3408; F16J 15/3412; F16J 15/3416;
(Continued)

(56) References Cited

U.S. PATENT DOCUMENTS 5,501,470 A    3/1996  Fuse et al. ................... 277/96.1
5,834,094 A  * 11/1998  Etsion et al. ................. 428/156
(Continued)

FOREIGN PATENT DOCUMENTS

CN    1667302    9/2005    ............... F16J 15/16
CN    2934785    8/2007    ............... F16J 15/16
(Continued)

OTHER PUBLICATIONS

International Preliminary Report on Patentability issued in corresponding application No. PCT/JP2012/070644, dated Mar. 13, 2014 (6 pgs).
(Continued)

*Primary Examiner* — Kristina Fulton
*Assistant Examiner* — Nicholas L Foster
(74) *Attorney, Agent, or Firm* — Hayes Soloway P.C.

(57) ABSTRACT

A plurality of circumferentially separated sealed-fluid-accommodating blocks are formed on either of the sealing faces of a stationary ring or rotating ring so as to communicate with a sealed fluid-containing space; pumping areas for generating a pumping action due to the sliding of the stationary ring and the rotating ring in relative rotation are formed on the bottom of the plurality of sealed-fluid-accommodating blocks; the pumping areas formed on the bottom of the plurality of sealed-fluid-accommodating blocks are provided with intake pumping areas operating in a direction so as to draw in the sealed fluid and outflow pumping areas operating in a direction so as to expel the sealed fluid; and a plurality of dimples are disposed on a seal dam area on a side of the sealing face on which the sealed-fluid-accommodating blocks are formed, the seal dam area being on the opposite side of the sealing face relative to the sealed-fluid side.

14 Claims, 8 Drawing Sheets

(52) U.S. Cl.
CPC ............. *F16J 15/34* (2013.01); *F16J 15/3404* (2013.01); *F16J 15/3408* (2013.01)

(58) Field of Classification Search
CPC .................... F16J 15/342; F16J 15/3442; F16J 15/3428
See application file for complete search history.

(56) References Cited

U.S. PATENT DOCUMENTS

| | | | | |
|---|---|---|---|---|
| 5,998,318 | A * | 12/1999 | Takanami et al. | 501/90 |
| 6,341,782 | B1 * | 1/2002 | Etsion | 277/399 |
| 8,360,436 | B2 | 1/2013 | Teshima et al. | 277/400 |
| 2003/0178781 | A1 * | 9/2003 | Tejima | 277/399 |
| 2003/0189294 | A1 * | 10/2003 | Tejima | 277/399 |
| 2004/0080112 | A1 * | 4/2004 | Tejima | 277/306 |
| 2004/0137217 | A1 * | 7/2004 | Tomoto et al. | 428/327 |
| 2007/0228664 | A1 * | 10/2007 | Anand et al. | 277/399 |
| 2009/0149309 | A1 * | 6/2009 | Akasaka et al. | 501/90 |
| 2011/0101616 | A1 | 5/2011 | Teshima et al. | 277/358 |
| 2011/0215531 | A1 * | 9/2011 | Tokunaga et al. | 277/399 |

FOREIGN PATENT DOCUMENTS

| | | | |
|---|---|---|---|
| CN | 101672364 | 3/2010 | ............... F16J 15/16 |
| CN | 201521637 | 7/2010 | ............... F16J 15/16 |
| JP | H0735242 | 2/1995 | ............... F16J 15/34 |
| JP | H11230364 | 8/1999 | ............... F16J 15/34 |
| JP | 2009014183 | 1/2009 | ............... F16J 33/24 |
| JP | 2010133496 | 6/2010 | ............... F16J 15/34 |
| WO | WO2007058177 | 5/2007 | ............... F16J 15/34 |
| WO | WO2009087995 | 7/2009 | ............... F16J 15/34 |
| WO | WO2010001762 | 1/2010 | ............... F16J 15/34 |

OTHER PUBLICATIONS

International Search Report issued in corresponding application No. PCT/JP2012/070644, dated Sep. 4, 2012 (4 pgs).

Chinese Office Action (w/translation) issued in application No. 201280039847.X, dated May 5, 2015 (11 pgs).

* cited by examiner

SLIDING PARTS

TECHNICAL FIELD

The present invention relates to relatively rotating sliding parts, and in particular to sliding parts used, for example, in the fields of automotive seals, general industrial mechanical seals, or other seals.

BACKGROUND ART

In sealing apparatus for preventing the leakage of a sealed fluid, such apparatus comprising two parts configured so as to rotate relatively to one another and so that ends thereof slide on a flat surface, such as, for example, a rotating ring and a stationary ring of a mechanical seal, a balance must be struck the two opposing conditions of "airtightness" and "lubrication" in order to maintain seal integrity for extended periods of time. In recent years, environmental concerns in particular have led to an increase in demand for reduced friction in order to reduce mechanical damage while preventing sealed fluid leakage. Methods of achieving friction reduction include the so-called fluid lubrication state, in which dynamic pressure is generated between sealing faces due to rotation, and the surfaces slide with a liquid membrane interposed therebetween. However, in such cases, positive pressure is generated between the sealing faces, so that the fluid flows from the positive pressure portion outside of the sealing faces. Such fluid outflow constitutes leakage in the case of a seal.

The inventors have already filed a patent application for a sliding member for a mechanical seal for sealing a sealed fluid present on one side in the radial direction of relatively rotationally sealing faces, wherein a plurality of grating portions 50, in which a plurality of parallel rectilinear indentations are formed at a predetermined pitch within a predetermined area, are formed apart from each other in the circumferential direction in the area between radii R2 and R3 on a sealing face 51 having an internal diameter R1 and an external diameter R4; the rectilinear indentations of the plurality of grating portions being formed so that the direction of the indentations is inclined at a predetermined angle relative to the sliding direction of the sealing face, thereby improving the introduction and retention of the sealed fluid between the sealing faces, and allowing stable and favorable lubricity to be obtained, as shown in FIG. 8 ("the prior art;" cf. patent document 1).

The function of a mechanical seal mechanical seal is to act as a "seal", and the path of the sealed fluid must be completely blocked when stopped in order to prevent leakage. To that end, an inner circumference 52 located on the atmosphere side of the grating portions 50 of the prior art described above is made to function as a seal dam area, preventing leakage while stopped.

The provision of the grating portions 50 in the prior art described above improves the lubricity of the sealing faces in the vicinity of the grating portions 50 from when rotation first starts, but the inner circumference 52 acting as a seal dam area tends to lack sufficient lubricity. The performance during actual testing confirmed that wear of the inner circumference 52 had occurred.

CITATION LIST

Prior Art Document

Patent Document

Patent Document 1: Domestic Re-publication of PCT International Application No. WO 2009/087995

SUMMARY OF INVENTION

Technical Problem

The present invention was contrived in order to resolve the problems in the prior art, it being an object thereof to provide sliding parts that do not leak when stopped, operate under fluid lubrication and prevent leakage when rotating, including during initial rotation, and are capable of striking a balance between airtightness and lubrication.

Solution to Problem

In order to achieve the above object, a first aspect of the sliding parts according to the present invention is characterized in being in which an annular stationary ring fixed on a fixed side and an annular rotating ring that rotates along with a rotating shaft oppose each other and sealing faces are caused to rotate relative to one another, whereby a sealed fluid present on one side in the radial direction of the relatively rotating sealing faces is sealed;

the sliding parts characterized in that:

a plurality of circumferentially separated sealed-fluid-accommodating blocks are formed on either of the sealing faces of the stationary ring or rotating ring so as to communicate with a sealed fluid-containing space;

pumping areas for generating a pumping action due to the sliding of the stationary ring and the rotating ring in relative rotation are formed on the bottom of the plurality of sealed-fluid-accommodating blocks;

the pumping areas formed on the bottom of the plurality of sealed-fluid-accommodating blocks are provided with intake pumping areas operating in a direction so as to draw in the sealed fluid and outflow pumping areas operating in a direction so as to expel the sealed fluid; and a plurality of dimples are disposed on a seal dam area on a side of the sealing face on which the sealed-fluid-accommodating blocks are formed, the seal dam area being on the opposite side of the sealing face relative to the sealed-fluid side.

A second aspect of the sliding parts according to the present invention is the first aspect, characterized in that the plurality of dimples are disposed so as to be aligned over an imaginary circumference centered on the center of the relative rotation of the stationary ring and the rotating ring.

A third aspect of the sliding parts according to the present invention is the first aspect, characterized in that the plurality of dimples are disposed so that discrete pluralities thereof are aligned over each of a plurality of imaginary circumferences of different diameters centered on the center of the relative rotation of the stationary ring and the rotating ring.

A fourth aspect of the sliding parts according to the present invention is the first aspect, characterized in that the plurality of dimples are disposed aligned over an imaginary spiral turning in the direction of the relative rotation of the stationary ring and the rotating ring.

A fifth aspect of the sliding parts according to the present invention is one of the first through the fourth aspects, characterized in that the plurality of dimples are provided within a limited area of the seal dam area.

A sixth aspect of the sliding parts according to the present invention is one of the first through the fifth aspects, characterized in that a solid lubricant is embedded within the plurality of dimples.

A seventh aspect of the sliding parts according to the present invention is the sixth aspect, characterized in that the solid lubricant is selected from PTFE, $MoS_2$, $WS_2$, graphite, or BN.

Advantageous Effects of Invention

The present invention yields the following superior effects.

(1) Owing to the characteristics of the first aspect described above, the sealing faces of the stationary ring and the rotating ring are in a state of solid contact when stopped, so that the sealing faces extending continuously in the circumferential direction, particularly the seal dam area, prevent leakage, thereby maintaining seal integrity; and, upon activation, a lubricant fluid membrane can quickly be formed by taking the sealed fluid into the spaces within the sealed-fluid-accommodating blocks, which combines with the plurality of dimples disposed on the seal dam area to lower the sliding torque of the sealing faces and reduce wear. Furthermore, during operation, the sealed fluid is drawn into the sealed-fluid-accommodating blocks provided with the intake pumping area, sent to the sealed-fluid-accommodating blocks provided with the outflow pumping areas located at a separate position with the sealing faces interposed therebetween, and returned from the sealed-fluid-accommodating blocks to the sealed fluid side through the action of the outflow pumping areas, thereby ensuring the lubricity of the sealing face, preventing leakage, and preserving seal integrity.

In addition, because the plurality of dimples are disposed around the entire circumference of the seal dam area, a hydrodynamic lubricant film (sealed fluid film) is formed; and because liquid lubricant (sealed fluid) is supplied from the dimples, the film of liquid lubricant (sealed fluid film) is stably formed on the seal dam area, thereby allowing sliding wear to be minimized.

(2) Owing to the characteristics of the second through the fourth aspects described above, a film of sealed fluid revolving around the rotational center of the rotating ring and the stationary ring is formed, allowing the flow of the sealed fluid in the radial direction to be blocked and seal functionality to be further improved.

(3) Owing to the characteristics of the fifth aspect described above, a load-bearing area can be secured.

(4) Owing to the characteristics of the sixth and seventh aspects described above, even should the formation of the lubricant film on the seal dam area be insufficient, leading to an under-lubricated state, and the sealing faces of the stationary ring and the rotating ring come into direct contact, and wear upon the seal dam area is reduced by the solid lubricant within the dimples, allowing seal functionality to be maintained for extended periods of time.

DESCRIPTION OF EMBODIMENTS

An embodiment of the sliding part according to the present invention will be described in detail with reference to the drawings.

In the present embodiment, the rotating ring and stationary ring constituting the mechanical seal are sliding parts, but the present invention should not be construed as being limited to such; various alterations, modifications, and improvements may be added according to the knowledge of a person skilled in the art within the scope of the present invention.

Figure 1:
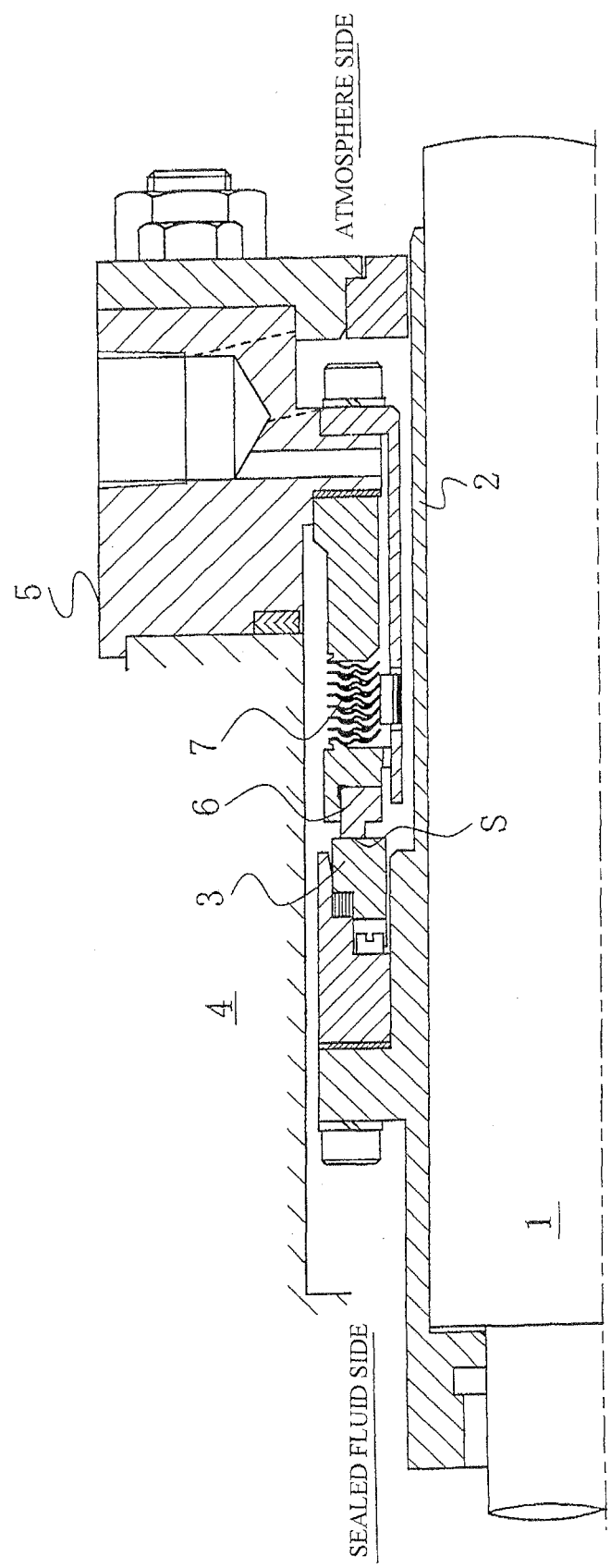
FIG. 1 is a front cross-sectional view of an example of a mechanical seal for ordinary industrial machinery.

FIG. 1 is a front cross-sectional view of an example of a mechanical seal for ordinary industrial machinery.

The mechanical seal shown in FIG. 1 is an inside-type seal for sealing a sealed fluid attempting to leak from the outer circumference of a sealing face in the inner circumference direction, wherein an annular rotating ring 3 rotatably provided integrally with a rotating shaft 1 for driving a sealed fluid-side pump impeller (not shown), a sleeve 2 being interposed between the rotating shaft 1 and the rotating ring 3, and an annular stationary ring 6 non-rotatably but movably provided with respect to the axial direction on a seal cover 5 fixed to a pump housing 4 are configured so that sealing faces S imparted with a mirrored finish via lapping or another process slide in close contact thanks to a bellows 7 urging the stationary ring 6 in the axial direction. In other words, in this mechanical seal, the sealed fluid is prevented from flowing from the outer circumference of the rotating shaft 1 out to the atmosphere side at the sealing faces S of the rotating ring 3 and the stationary ring 6.

The rotating ring 3 and stationary ring 6 are typically both formed from SiC (a hard material), or from a combination of SiC (a hard material) and carbon (a soft material), but a sliding material used in mechanical seals can be applied as the sliding material. The SiC can be a sintered piece in which boron, aluminum, carbon, or the like is used as a sintering aid, or another material having two or more types of phases of differing components or composition, such as SiC containing dispersed graphite particles, reaction-sintered SiC of SiC and Si, SiC—TiC, SiC—TiN, and the like. The carbon can be carbon containing a mixture of carbon and graphite, or resin-molded carbon, sintered carbon, or the like. Apart from the abovementioned sliding materials, a metal material, resin material, surface-modified material (coating material), composite material, or the like can also be used.

Figure 2:
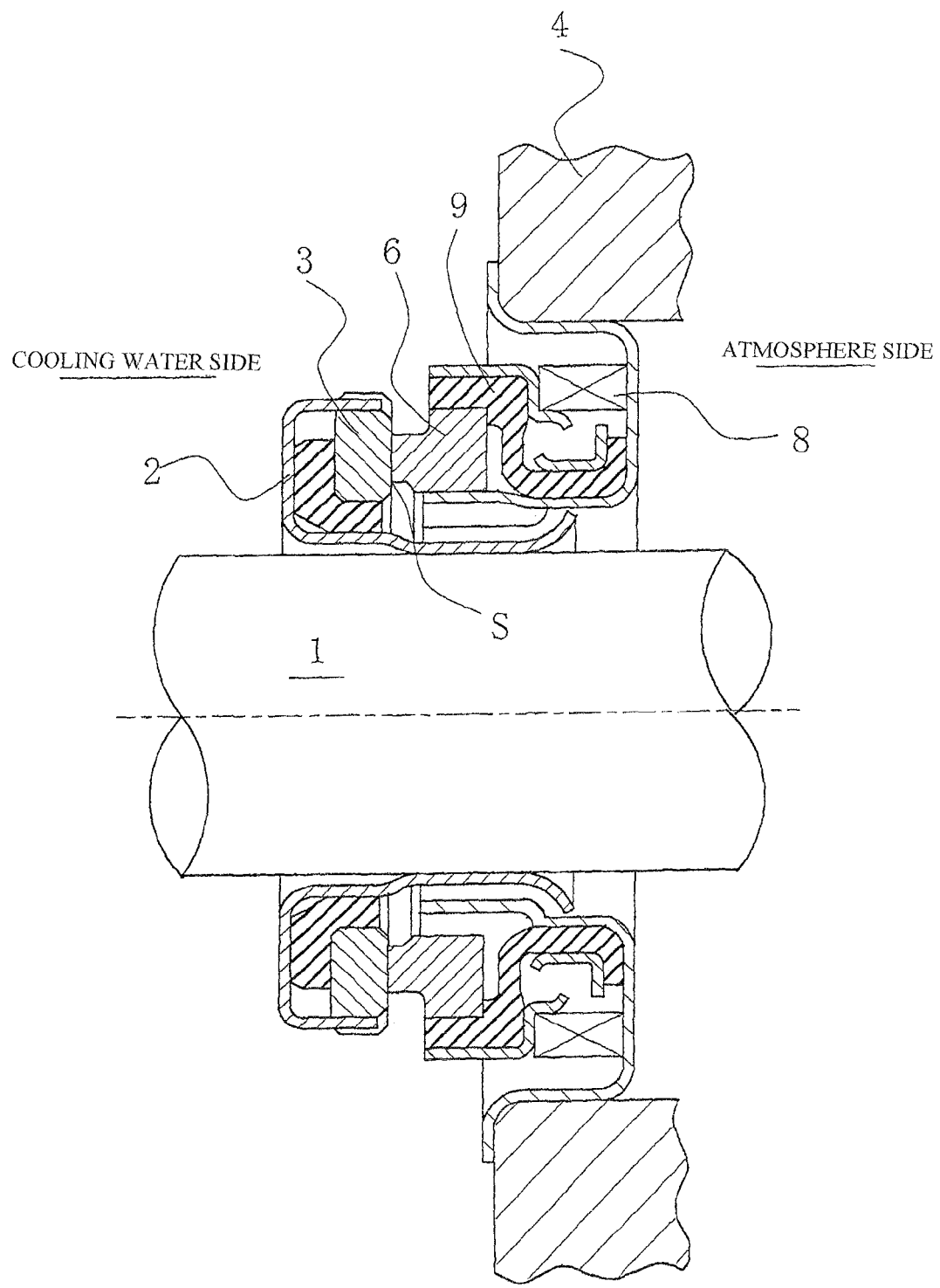
FIG. 2 is a front cross-sectional view of an example of a mechanical seal for a water pump.

FIG. 2 is a front cross-sectional view of an example of a mechanical seal for a water pump.

The mechanical seal shown in FIG. 2 is an inside-type seal for sealing cooling water attempting to leak from the outer circumference of a sealing face in the inner circumference direction, in which an annular rotating ring 3 rotatably provided integrally with a rotating shaft 1 for driving a cooling water-side pump impeller (not shown), a sleeve 2 being interposed between the rotating shaft 1 and the rotating ring 3, and an annular stationary ring 6 non-rotatably but movably provided with respect to the axial direction on a pump housing 4 are configured so that sealing faces S imparted with a mirrored finish via lapping or another process slide in close contact thanks to a coiled wave spring 8 and a bellows 9 urging the stationary ring 6 in the axial direction. In other words, in this mechanical seal, the cooling water is prevented from flowing from the outer circumference of the rotating shaft 1 out to the atmosphere side at the sealing faces S of the rotating ring 3 and the stationary ring 6.

Embodiment 1

Figure 3:
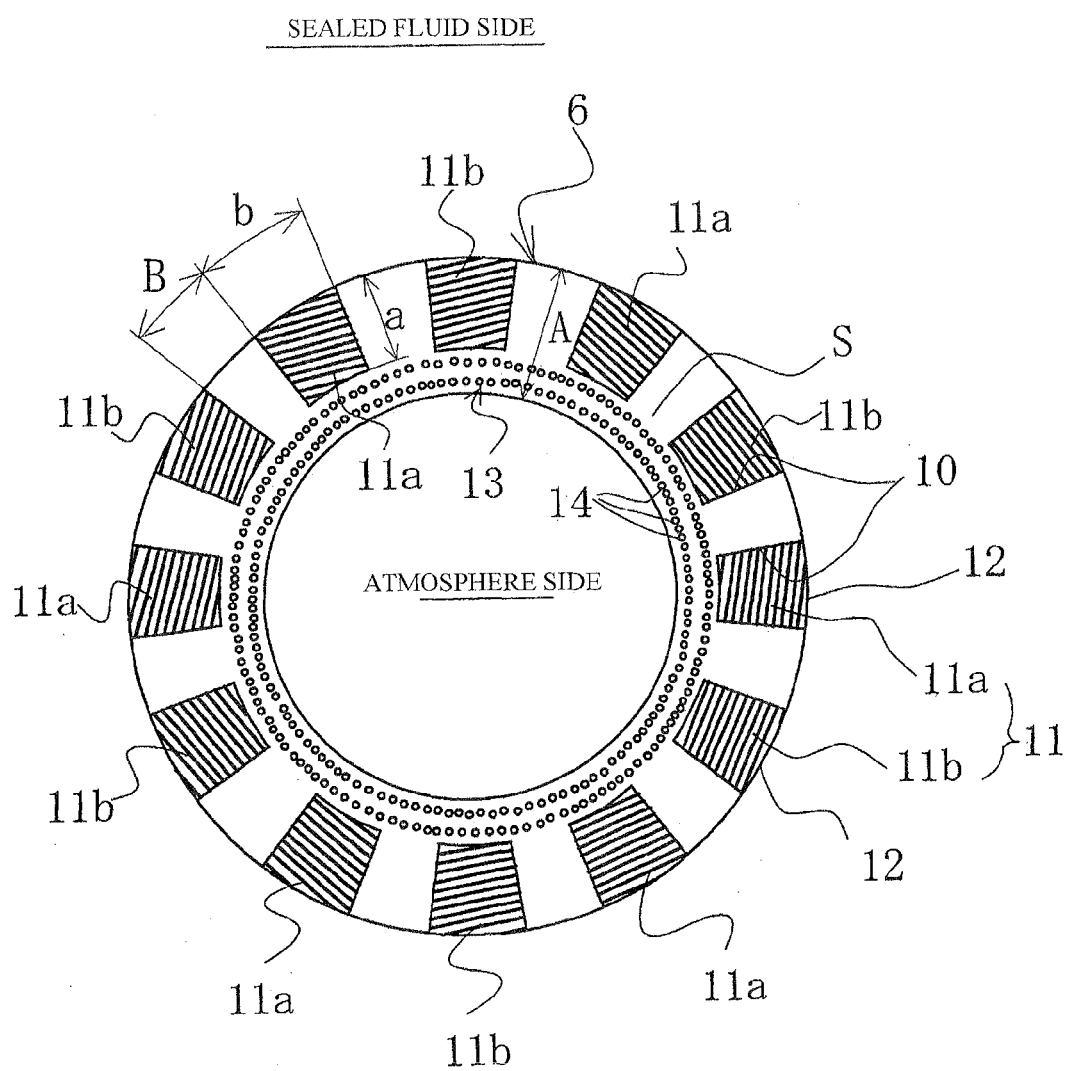
FIG. 3 is a plan view of a first embodiment of the mechanical seal shown in FIGS. 1 and 2 in which sealed-fluid-accommodating blocks, pumping areas, and a seal dam area on which a plurality of dimples are disposed are formed on the sealing face of the stationary ring, which, of the sealing faces of the stationary ring and the rotating ring, has the smaller width in the radial direction.

FIG. 3 is a plan view of a first embodiment of the mechanical seal shown in FIGS. 1 and 2 in which sealed-fluid-accommodating blocks, pumping areas, and a seal dam area on which a plurality of dimples are disposed are formed on the sealing face S of the stationary ring 6, which, of the sealing faces of the stationary ring 6 and the rotating ring 3, has the smaller width in the radial direction.

In FIG. 3, the stationary ring 6 is referred to as a seal ring, and is often formed from carbon (a soft material). A plurality of circumferentially separated sealed-fluid-accommodating blocks 10 are formed on the sealing face S of the stationary ring 6 in the circumferential direction so as to be a part of the radial direction of the sealing face S and directly communicate with the sealed fluid-containing space via an outer circumference side 12.

In the case of an outside-type mechanical seal in which the sealed fluid side is to the inside of the rotating ring 3 and the stationary ring 6, the sealed-fluid-accommodating blocks 10 need only be formed as part of the sealing face S in the radial direction and directly communicate with the sealed fluid-containing space via the inner circumference side.

The width a of the radial direction of the sealed-fluid-accommodating blocks 10 is roughly one- to two-thirds that of the width A of the radial direction of the sealing faces S, and the angular range b of the sealed-fluid-accommodating blocks 10 in the circumferential direction is the same or somewhat larger than the angular range B of the sealing faces between adjacent sealed-fluid-accommodating blocks 10, 10.

In order to reduce friction upon the mechanical seal, a liquid membrane roughly 0.1 μm to 10 μm thick between the sealing faces is necessary, depending on the type, temperature, and the like of the sealed fluid. In order to obtain such a liquid membrane, a plurality of sealed-fluid-accommodating blocks 10 independent along the circumferential direction is disposed on the sealing faces S, as described above, and pumping areas 11 for generating a pumping action through the relative rotational sliding of the stationary ring 6 and the rotating ring 3 are provided on the bottom of the plurality of sealed-fluid-accommodating blocks 10. The pumping areas 11 formed on the bottom part of the plurality of sealed-fluid-accommodating blocks are provided with intake pumping areas 11a operating in a direction so as to draw in the sealed fluid and outflow pumping areas 11b operating in a direction so as to expel the sealed fluid.

Figure 5:
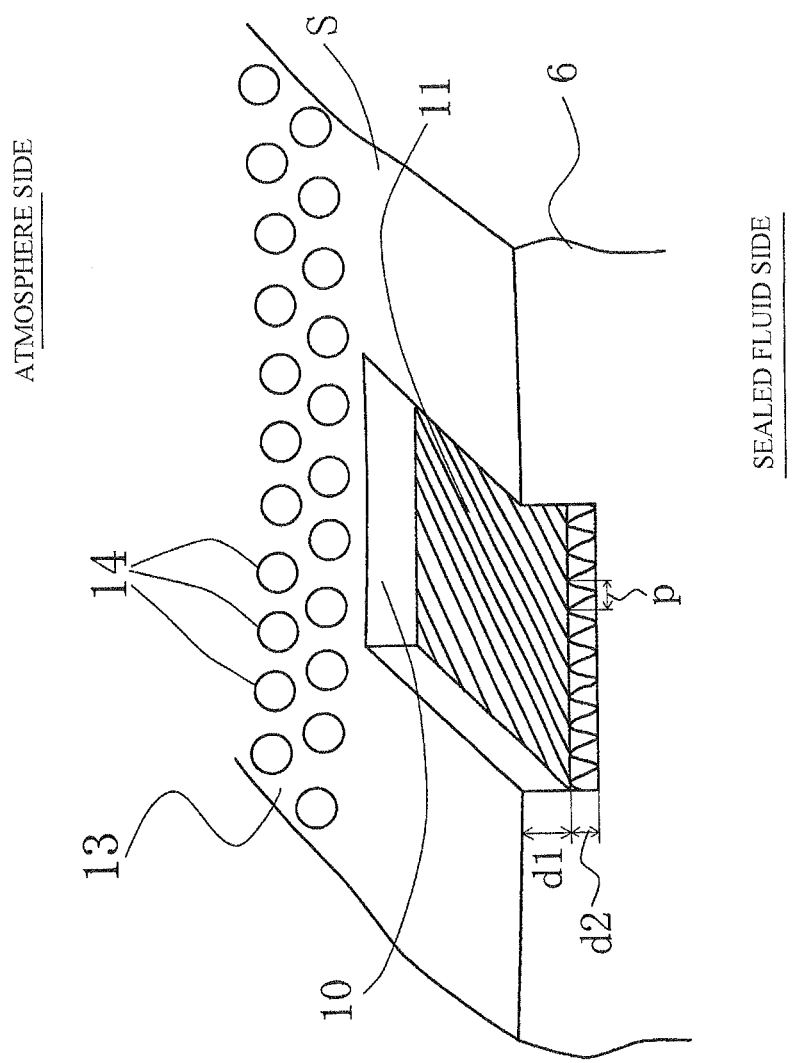
FIG. 5 is a perspective view, from the sealed fluid side, of the sealed-fluid-accommodating blocks, pumping areas, and seal dam area on which a plurality of dimples are disposed from FIGS. 3 and 4.

As shown in detail in FIG. 5 as described hereafter, a plurality of parallel linear indentations (also referred to as a "periodic linear indentation structure" in the present invention) is formed at a fixed pitch in each of the pumping areas 11, the periodic linear indentation structure being a fine structure formed using, for example, a femtosecond laser.

In the present invention, the "linear indentations" encompass not only rectilinear indentations, but also somewhat curved indentations appearing during the process of forming rectilinear indentations, as well as curvilinear indentations.

The sealed fluid side of the sealing face in which the sealed-fluid-accommodating blocks 10 are formed and the opposing inner circumference side must function as a seal dam for preventing leakage when stopped. Because the seal dam area 13 providing this seal dam function is a part not fully covered by the sealed fluid (lubricating fluid), it is liable to be poorly lubricated and undergo wear. In order to prevent wear of the seal dam area 13 and reduce sliding friction, a plurality of dimples 14 is disposed on the seal dam area 13 of the present invention.

Figure 4:
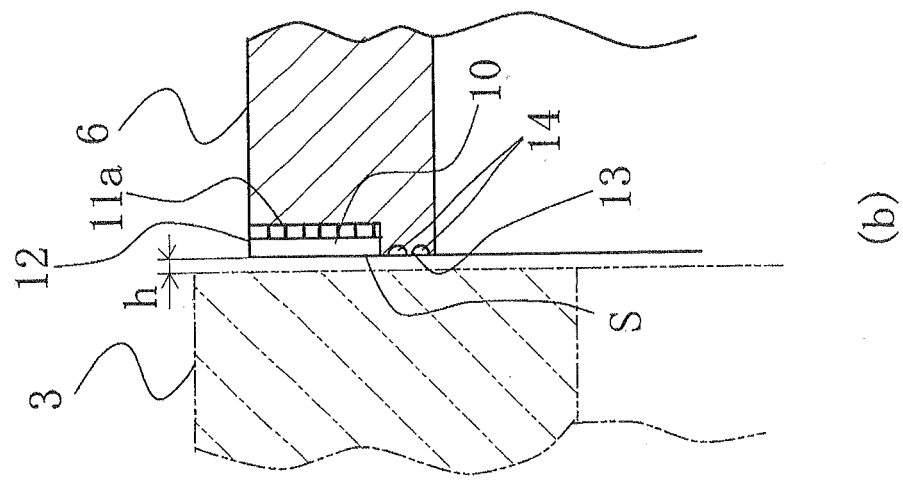
FIG. 4 shows the sealed-fluid-accommodating blocks, pumping areas, and seal dam area, shown in FIG. 3, on which a plurality of dimples are disposed in operation, with 4(a) being a magnified plan view of the main parts, and 4(b) being a cross-sectional view along line X-X in 4(a)
Figure 4:
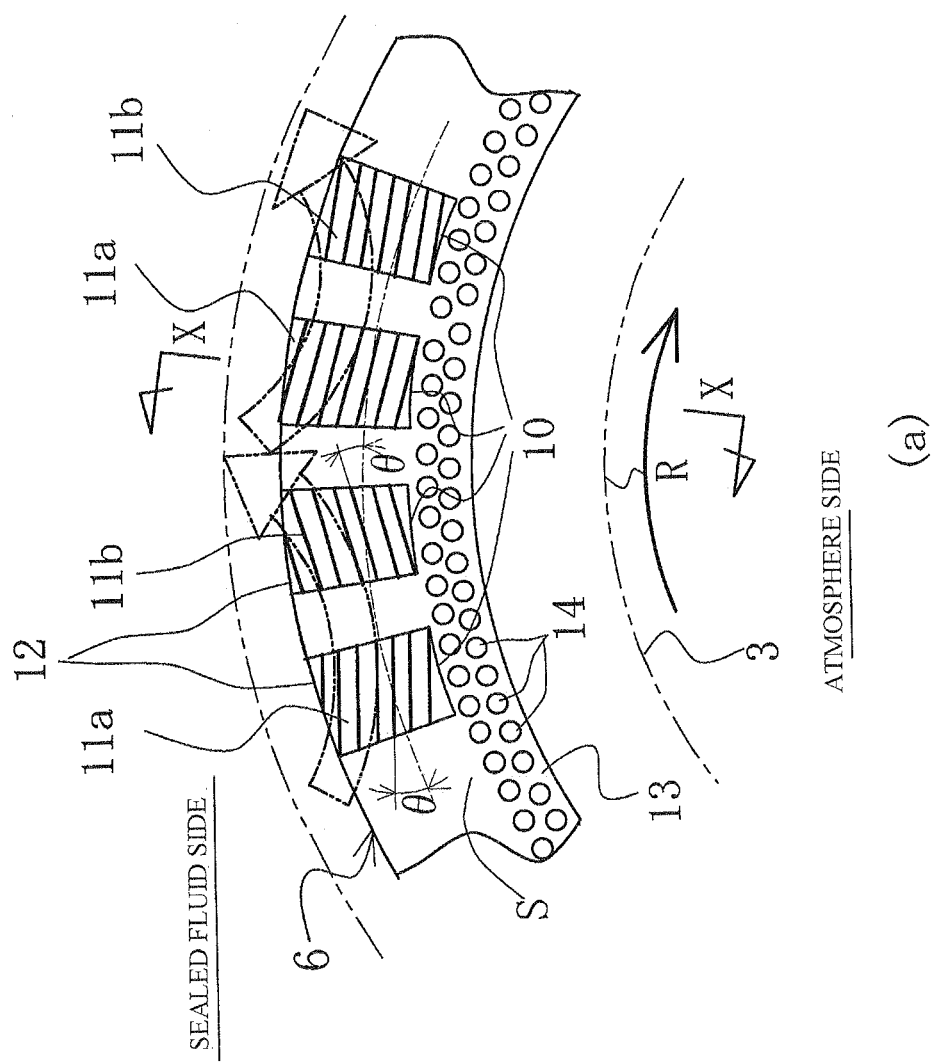

FIG. 4 shows the sealed-fluid-accommodating blocks, pumping areas, and seal dam area on which a plurality of dimples are disposed, as shown in FIG. 3, in operation, with 4(a) being a magnified plan view of the main parts, and 4(b) being a cross-sectional view along line X-X in 4(a).

In FIG. 4, the stationary ring 6 is represented by a solid line, and the rotating ring 3 acting as the counterpart sliding member by a double-dashed line, the rotating ring 3 rotating in direction R.

As shown in FIG. 4(a), the plurality of sealed-fluid-accommodating blocks 10 is separated from adjacent sealed-fluid-accommodating blocks 10 in the circumferential direction by the sealing face S, and is also kept from communicating with the atmosphere side by the sealing face S. As shown in FIG. 4(b), the sealed-fluid-accommodating blocks 10 are formed as part of the sealing face S in the radial direction, describe an indented shape capable of containing sealed fluid, form a difference in level with the sealing faces S, and directly communicate with the sealed fluid-containing space via the outer circumference side 12. Because the sealing faces of the stationary ring 6 and the rotating ring 3 are thus in solid contact when stopped, seal integrity is maintained by the continuous sealing face in the circumferential direction, and, upon activation, the sealed fluid is drawn into the sealed-fluid-accommodating blocks 10, as shown by the double-dashed arrows in FIG. 4(a).

In addition, as shown in FIG. 4(a), the linear indentations formed in the pumping areas 11 incline at a predetermined angle θ with respect to the sliding direction of the sealing faces S; i.e., with the direction of the tangent line of the rotation of the sealing faces S. The predetermined angle θ is preferably from 10° to 80° with respect to the tangent line of the rotation of the sealing face S in both the inner circumference direction and the outer circumference direction of the sealing face S.

The angle of inclination θ of the linear indentations of the pumping areas 11 in each of the plurality of sealed-fluid-accommodating blocks 10 with respect to the tangent line of rotation may be the same for all pumping areas 11, or may differ for each pumping area 11. However, because the sliding properties of the sealing faces S are affected by the angle of inclination θ, imparting the indentations of all of the pumping areas 11 with an appropriate specific angle of inclination θ according to the desired lubricity and sliding conditions is effective for obtaining stable sliding properties.

Thus, if the sealing faces S rotatingly slide in one direction, the angle of inclination θ of the linear indentations of the plurality of pumping areas 11 with respect to the tangent line of rotation will be defined as a specific optimal angle.

If the sealing faces S rotatingly slide in both the forward and the reverse directions, preferably present are both first pumping areas having linear indentations inclining at a first angle with respect to the tangent line of rotation yielding suitable sliding properties during rotation in one direction and second pumping areas having linear indentations inclining at a second angle with respect to the tangent line of rotation yielding suitable sliding properties during rotation in the opposite direction. Such a configuration allows suitable sliding properties to be obtained when the sealing faces S rotate in the forward and reverse directions.

More specifically, if the sealing faces S rotate in both the forward and reverse directions, the angle of inclination θ of the linear indentations of the intake pumping areas 11*a* and outflow pumping areas 11*b* are preferably formed so as to be symmetrical with respect to the tangent line of rotation.

The intake pumping areas 11*a* and outflow pumping areas 11*b* are preferably formed so as to be alternatingly disposed along the circumferential direction of the sealing faces S.

The sealing faces S shown in FIGS. 3 and 4 have a configuration preferable for cases in which the sealing faces S rotate in both directions.

The intake pumping areas 11*a* and outflow pumping areas 11*b* need not be alternatingly disposed along the sealing faces S in the circumferential direction, but rather, for example, two intake pumping areas 11*a* may be disposed for every outflow pumping area 11*b*; the reverse ratio is also acceptable.

The pumping areas 11, which are structures in which a plurality of parallel linear indentations is disposed with high precision at a predetermined pitch (periodic structures of linear indentations), are strictly divided, for example, by using a femtosecond laser within a predetermined area of the sealing face S, then precisely controlling the laser and forming in the direction of the linear indentations in each division.

If a substrate is irradiated using a linearly polarized laser at an irradiation intensity near a machining threshold value, the interference of the incident light and scattered light or plasma waves along the surface of the substrate will lead to an periodic structure of linear indentations having a wavelength-order pitch and groove depth self-forming orthogonally to the polarization direction. Here, the femtosecond laser may be operated while being made to overlap, thereby allowing a periodic linear indentation structure pattern to be formed on the surface.

In a periodic linear indentation structure formed using a femtosecond laser in this way, the directionality thereof can be controlled, as well as the machining position, allowing a desired periodic linear indentation structure to be formed within each of disparate small divisions. Specifically, if the sealing face of an annular mechanical seal sliding member is rotating while this method is used, a fine periodic pattern can be selectively formed on the sealing face. In addition, using a machining method involving a femtosecond laser allows for the formation of linear indentations of sub-micron-order depth, which is effective in improving the lubricity and reducing the leakage of the mechanical seal.

The sealed-fluid-accommodating blocks 10 and periodic linear indentation structure are not limited to being formed using a femtosecond laser; a picosecond laser or electron beam may also be used. The sealed-fluid-accommodating blocks 10 and periodic linear indentation structure may also be formed by performing stamping or imprinting using a mold provided with a periodic linear indentation structure while the sealing face of the annular mechanical seal member is being rotated.

The sealed-fluid-accommodating blocks 10 may also be formed by performing etching, then forming a periodic linear indentation structure in the bottom of the sealed-fluid-accommodating blocks using a femtosecond laser or the like. The sealed-fluid-accommodating blocks 10 may also be formed by forming only a periodic linear indentation structure on the sealing face using a femtosecond laser or the like, then plating or forming a film on the sealing face where the periodic linear indentation structure is not formed.

Meanwhile, the seal dam area 13 constitutes a part of the sealing face S and is flush with the sealing faces S; the inner circumference side sealing face S becomes the seal dam area 13, owing to the divisions in which the plurality of sealed-fluid-accommodating blocks 10 is formed. In order to prevent wearing and reduce sliding friction, a plurality of dimples 14 is disposed on the seal dam area 13.

The plurality of dimples 14 forms a hydrodynamic lubricant film (sealed fluid film) and supplies liquid lubricant (sealed fluid) from the dimples 14, and the provision of the plurality of dimples 14 on the seal dam area 13 allows the stable formation of a film of liquid lubricant (sealed fluid) on the seal dam area 13, minimizing sliding wear.

The plurality of dimples 14 may be produced using a laser, blasting, or stamping (mold casting) after the stationary ring 6 has been formed from a material suitable for a sliding material; or pores may be formed in the seal dam area 13 by manufacturing the stationary ring 6 using a predetermined proportion of a porous sliding material having multiple pores, such as carbon, SiC, or a cemented carbide.

However, the fundamental purpose of the seal dam area 13 is to maintain seal integrity. To this end, the seal dam area 13 must block the flow of the sealed fluid in the leakage direction, i.e., the radial direction of the sealing face.

In order to block the flow of the sealed fluid in the radial direction, the dimples 14 are preferably disposed so that a dimple 14 lying downstream in the rotational direction out of two dimples 14 adjacent to each other in the rotational direction is present within the range of the film formed downstream in the rotational direction during sliding by the sealed fluid sealed when stopped within the dimple 14 lying upstream in the rotational direction out of the two dimples 14.

For example, the plurality of dimples 14 may be disposed so as to be aligned over an imaginary circumference centered on the center of rotation of the rotating ring 3 and the stationary ring 6.

A sealed fluid film is thereby formed so as to connect the dimples 14, so that the sealed fluid film is formed so as to revolve around the center of rotation of the rotating ring 3 and the stationary ring 6 on the sliding parts of the rotating ring 3 and the stationary ring 6, blocking the flow of the sealed fluid in the radial direction.

In another example, the plurality of dimples 14 may be disposed so that a plurality thereof are aligned over each of a plurality of imaginary circumferences of different diameters centered on the center of rotation of the rotating ring 3 and the stationary ring 6.

A plurality of concentric sealed fluid films is thereby formed. Thus, a film of sealed fluid is stably formed on the sealing face, and movement of the sealed fluid in the radial direction can be minimized.

In yet another example, the plurality of dimples 14 may be disposed so as to be aligned over an imaginary spiral turning in the rotational direction of the rotating ring 3 and the stationary ring 6.

A spiral-shaped sealed fluid film is thereby formed. It is also possible to generate a pumping action in which the sealed fluid flows in a spiral shape according to the rotational direction. It is thus possible to generate a pumping action so that the sealed fluid is returned to a sealed area side, improving seal performance.

The plurality of dimples 14 need only be provided in a limited area of the seal dam area 13.

Specifically, because providing a plurality of dimples 14 reduces the load-bearing area, it is possible to ensure the load-bearing area by disposing the dimples 14 only within a limited area of the sealing face.

The various features described above can be used in combination to the extent possible.

Examples of the shape of the dimples 14 include circular, ellipsoidal, and rectangular.

The depth of the dimples 14 is preferably such that a hydrodynamic pressure-generating action is not caused by the geometrical shape thereof (or is caused only to a negligible degree if such action is present). For example, if the dimples 14 are configured so as to be circular in shape, the depth thereof is preferably from 30 to 50 µm, and the diameter from 60 to 80 µm.

FIG. 5 is a perspective view from the sealed fluid side of the sealed-fluid-accommodating blocks, pumping areas, and seal dam area on which a plurality of dimples are disposed from FIGS. 3 and 4.

As shown in FIG. 4(b), a liquid membrane h from 0.1 to 10 µm is formed between the sealing faces of the stationary ring 6 and the rotating ring 3 from initial rotation throughout operation; here, an imaginary plane connecting the apexes of the indented portions of the pumping areas 11 is set lower than the sealing face S by d1 (0.1h to 10h) according to the liquid membrane h, and the imaginary plane forms a level difference d1 with the sealing face S. The sealed fluid is taken into the space in the sealed-fluid-accommodating blocks 10 formed by the level difference d1, forming a sufficient liquid membrane. However, pressure differences may lead to leakage if only a sufficient liquid membrane is formed. For this reason, the pumping areas 11, which generate a liquid flow so that the sealed fluid does not leak to the atmospheric side, are formed on the bottom of the sealed-fluid-accommodating blocks 10.

If using a femtosecond laser, the sealed-fluid-accommodating blocks 10 are formed first, followed by the pumping areas 11.

The depth d2 between the apexes and troughs of the indentations is preferably such that d2 is 0.1h to 10h.

The pitch p of the linear indentations of the pumping areas 11 is set according to the viscosity of the sealed fluid, but is preferably from 0.1 µm to 100 µm. If the sealed fluid has a high viscosity, the pitch p should be increased so that a sufficient amount of fluid can enter the grooves.

The plurality of dimples 14 for preventing wear and reducing sliding friction is disposed on the part of the seal dam area 13 closer to the inner circumference than the area in which the plurality of sealed-fluid-accommodating blocks 10 is formed. The plurality of dimples 14 are disposed so that discrete pluralities thereof are aligned over each of a plurality of imaginary circumferences of different diameters centered on the center of rotation of the rotating ring 3 and the stationary ring 6. The dimples 14 serve to collect and supply the liquid lubricant (sealed fluid).

Thus, because the seal dam area 13, along the entire circumference of which the plurality of dimples 14 are formed, is formed closer to the inner circumference (atmosphere) side than the sealed-fluid-accommodating blocks 10 provided on the outer circumference side of the sealing face S so as to directly communicate with the sealed fluid, the sealing faces of the stationary ring 6 and the rotating ring 3 are in a state of solid contact at the seal dam area 13 when stopped, preventing leakage, while a lubricant film is formed by the dimples 14 of the seal dam area 13 when the rings are rotating.

Embodiment 2

Figure 6:
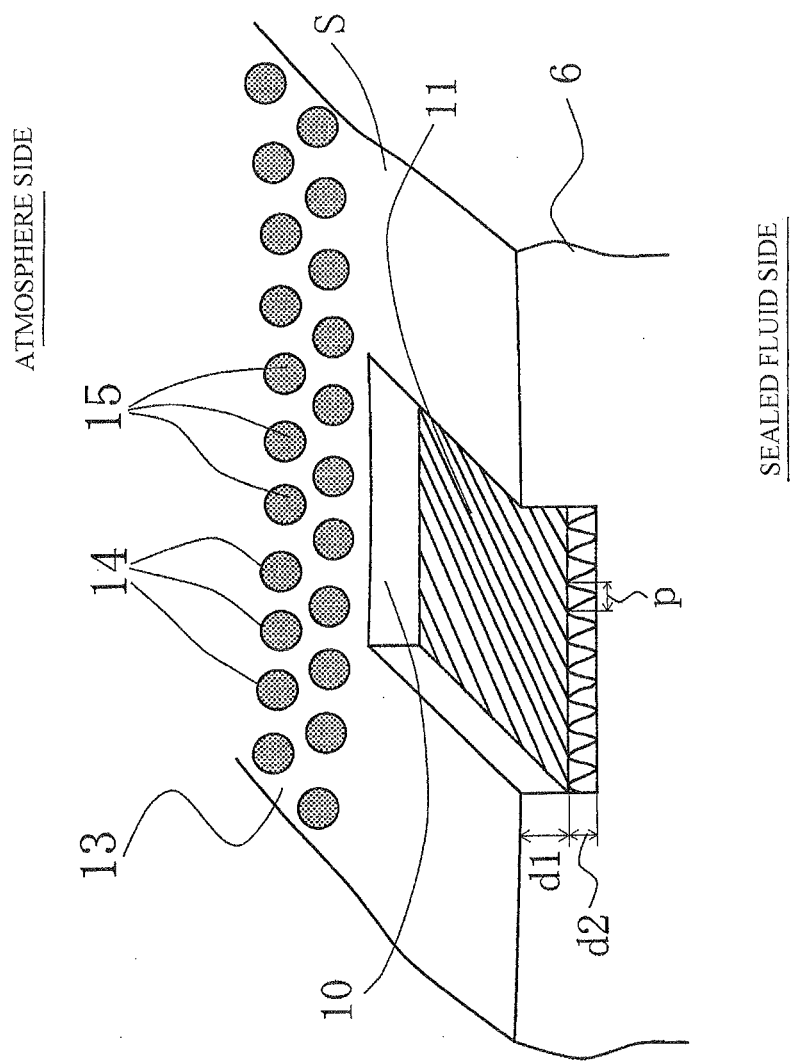
FIG. 6 is a perspective view from the sealed fluid side of a second embodiment of the mechanical seal shown in FIGS. 1 and 2 in which sealed-fluid-accommodating blocks, pumping areas, and a seal dam area on which a plurality of dimples are disposed are formed on the sealing face of the stationary ring, which, of the sealing faces of the stationary ring and the rotating ring, has the smaller width in the radial direction.

FIG. 6 is a perspective view from the sealed fluid side of a second embodiment of the mechanical seal shown in FIGS. 1 and 2 in which sealed-fluid-accommodating blocks, pumping areas, and a seal dam area on which a plurality of dimples are disposed are formed on the sealing face of the stationary ring, which, of the sealing faces of the stationary ring and the rotating ring, has the smaller width in the radial direction.

In FIG. 6, a solid lubricant 15 is embedded within each of the plurality of dimples 14 disposed on the seal dam area 13. The solid lubricant 15 is provided so that the surface thereof forms the same surface as the sealing face S. Thus, even if the lubricant film is inadequately formed on the seal dam area 13, leading to an under-lubricated state, and the sealing faces of the stationary ring 6 and the rotating ring 3 come into direct contact, it is possible to prevent wear of the sealing faces owing to the solid lubricant 15 within the dimples 14.

The solid lubricant 15 can be embedded by, for instance, applying the solid lubricant in liquid form to the dimples 14, then drying the lubricant until hard; directly rubbing the solid lubricant onto the dimples 14; or coating the dimples 14 with the solid lubricant via sputtering or the like, followed by polishing off the excess portion.

The solid lubricant 15 is preferably selected from PTFE, $MoS_2$, $WS_2$, graphite, BN, or the like.

Because the seal dam area 13, along the entire circumference of which the plurality of dimples 14 is formed, is thus formed closer to the inner circumference (atmosphere) side than the sealed-fluid-accommodating blocks 10 provided on the outer circumference side of the sealing face S so as to directly communicate with the sealed fluid, and the solid lubricant 15 is embedded in the dimples 14, the sealing faces of the stationary ring 6 and the rotating ring 3 are in a state of solid contact at the seal dam area 13 when stopped, preventing leakage; while, if the formation of the lubricant film on the seal dam area 13 is insufficient, leading to an under-lubricated state, and the sealing faces of the stationary ring 6 and the rotating ring 3 come into direct contact while rotating, wear on the sealing faces is prevented by the solid lubricant 15 within the dimples 14.

In FIGS. 5 and 6, the pumping areas 11 are formed parallel to a plane orthogonal to the axis in the circumferential direction and radial direction, but the pumping areas 11 may optionally be inclined in the circumferential direction and/or radial direction as necessary. For example, if the pumping areas 11 are formed as shown in FIG. 3, it is conceivable for the intake pumping areas 11a to be formed so as to gradually decrease in height towards the interior along the radial direction, allowing the sealed fluid to be drawn in more easily, and the outflow pumping areas 11b to be formed so as to gradually increase in height towards the interior along the radial direction, allowing the sealed fluid to be expelled more easily.

As described above, the sealing faces of the stationary ring 6 and the rotating ring 3 are in a state of solid contact when stopped, so that the sealing faces S extending continuously in the circumferential direction, particularly the seal dam area 13, prevent leakage, thereby maintaining seal integrity; and, upon activation, a lubricant fluid membrane can quickly be formed by taking the sealed fluid into the spaces within the sealed-fluid-accommodating blocks 10, combining with the plurality of dimples disposed on the seal dam area 13 to lower the sliding torque of the sealing faces S and reduce wear. Furthermore, during operation, the sealed fluid is drawn into the sealed-fluid-accommodating blocks 10 provided with the intake pumping areas 11a, sent to the sealed-fluid-accommodating blocks 10 provided with the outflow pumping areas 11b located at a separate position with the sealing faces S interposed therebetween, and returned from the sealed-fluid-accommodating blocks 10 to the sealed fluid side through the action of the outflow pumping areas 11b (cf. the double-dashed arrows in FIG. 4(a)). This sealed fluid flow allows the lubricity of the sealing faces S to be ensured, leakage to be prevented, and seal integrity to be preserved. In addition, because the imaginary plane connecting the apexes of the linear indentations of the pumping areas 11 is set lower than the sealing face S, and the imaginary plane forms a level difference d1 with the sealing face S, a lubricating fluid membrane can quickly be formed by taking the sealed fluid into the space formed by the level difference d1 upon activation.

Furthermore, because the plurality of dimples 14 are disposed along the entire circumference of the seal dam area 13, a lubricant film is formed on the seal dam area 13; and, if solid lubricant 15 is embedded in each of the dimples 14, even if the formation of the lubricant film on the seal dam area 13 should be insufficient, leading to an under-lubricated state, and the sealing faces of the stationary ring 6 and the rotating ring 3 come into direct contact, wear upon the seal dam area 13 is reduced by the solid lubricant 15 within the dimples 14, allowing seal functionality to be maintained for extended periods of time.

Embodiment 3

Figure 7:
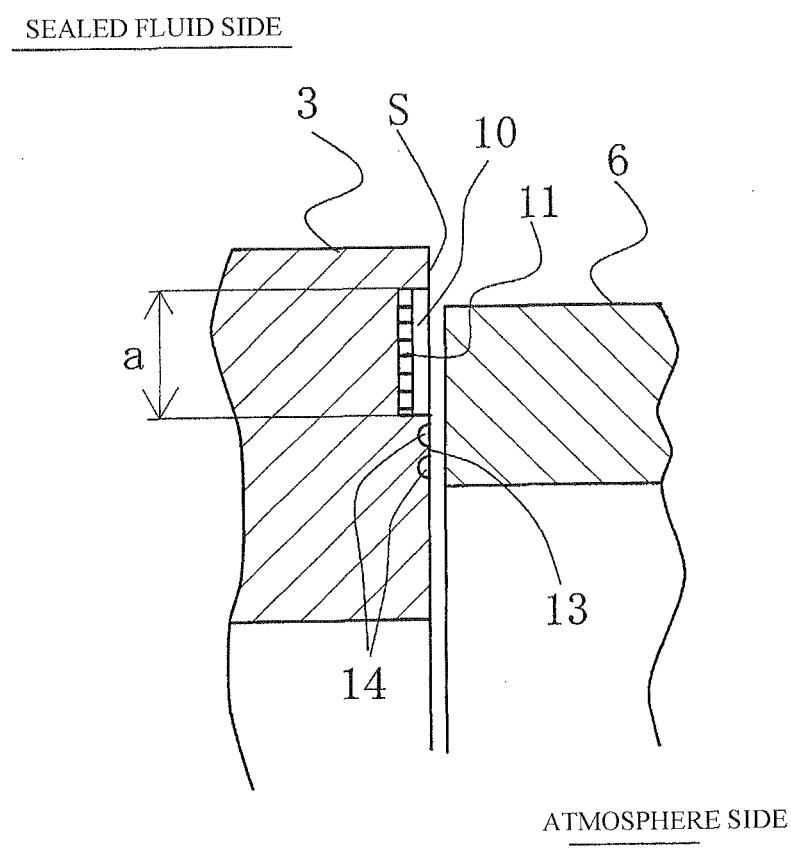
FIG. 7 is a cross-sectional view along a plane orthogonal to the sealing faces of one embodiment of the mechanical seal shown in FIGS. 1 and 2 in which a sealed-fluid-accommodating block, pumping area, the seal dam area on which a plurality of dimples are disposed are formed on the sealing face of the rotating ring, which has the larger width in the radial direction of the sealing faces of the stationary ring and the rotating ring.
Figure 8:
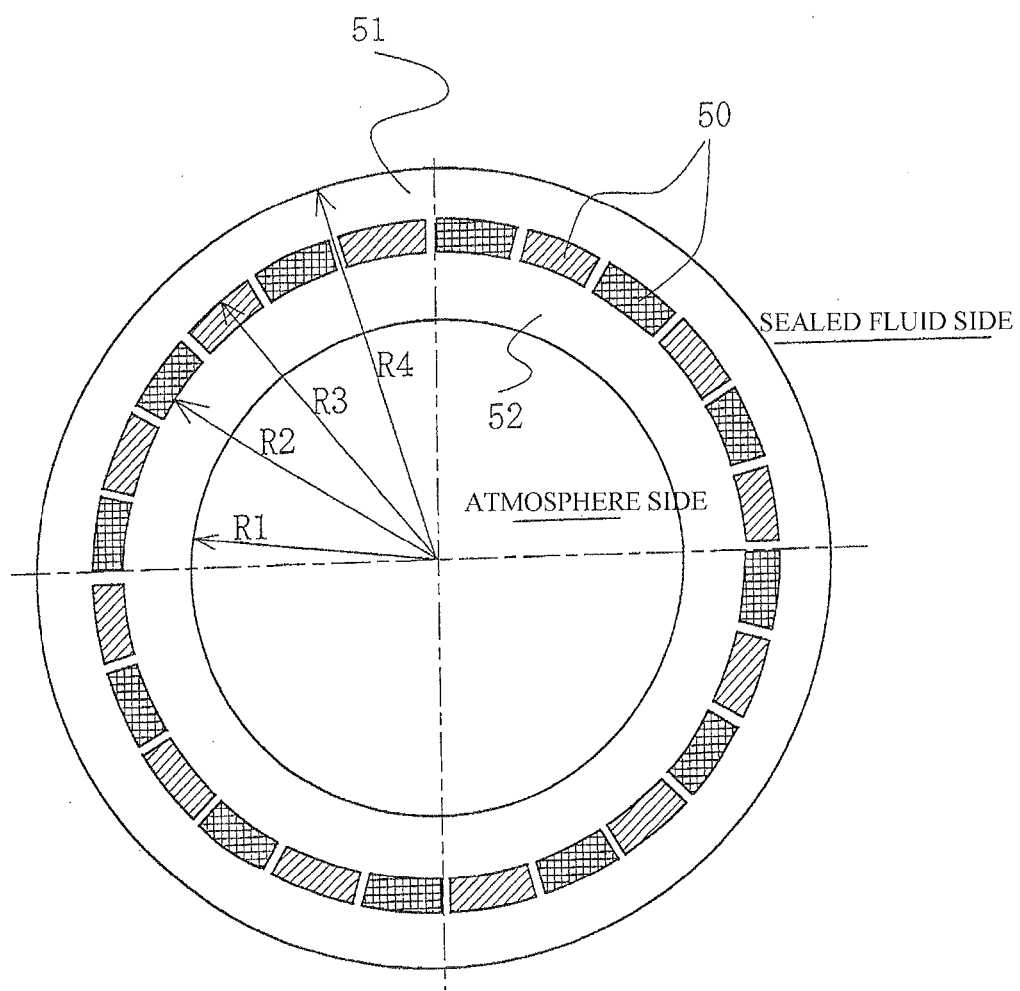
FIG. 8 is a plan view of the prior art.

FIG. 7 is a cross-sectional view along a plane orthogonal to the sealing faces of one embodiment of the mechanical seal shown in FIGS. 1 and 2 in which a sealed-fluid-accommodating block, pumping area, and seal dam area on which a plurality of dimples are disposed are formed on the sealing face of the rotating ring, which, of the sealing faces of the stationary ring and the rotating ring, has the larger width in the radial direction.

In FIG. 7, the rotating ring 3 is referred to as a mating ring, and is often formed from SiC (a hard material). A plurality of circumferentially separated sealed-fluid-accommodating blocks 10 are formed on the sealing face S of the rotating ring 3. The plurality of sealed-fluid-accommodating blocks 10 are formed over a part of the outer and inner parts of the radial direction of the sealing face S, and are formed so that a part of the sealed fluid in the sealed-fluid-accommodating blocks 10 is not covered by the corresponding sealing face S of the stationary ring 6. Seal integrity while stopped is thus maintained, and sealed fluid is taken into the sealed-fluid-accommodating blocks 10 upon activation.

The seal dam area 13 on which the plurality of dimples 14 are disposed is formed on the inner circumference (atmosphere) side of the area of the sealing face S of the rotating ring 3 in which the sealed-fluid-accommodating blocks 10 are formed.

While the plurality of dimples may be formed along the entirety of the circumference to the interior of the sealed-fluid-accommodating blocks 10 on the sealing face S of the rotating ring 3, in the present example, the plurality of dimples 14 are formed only on the parts sliding along the stationary ring 6.

In addition, while not illustrated here, it shall be apparent that solid lubricant 15 may also be embedded within the plurality of dimples 14, as in the case of the second embodiment.

In the third embodiment, as in the case of the first embodiment, a lubricant film is formed on the seal dam area 13 owing to the plurality of dimples 14. Also, as in the case of the second embodiment, if solid lubricant 15 is embedded within the plurality of dimples 14, even if the formation of the lubricant film on the seal dam area 13 should be insufficient, leading to an under-lubricated state, and the sealing faces of the stationary ring 6 and the rotating ring 3 come into direct contact, wear upon the seal dam area 13 is reduced by the solid lubricant 15 within the dimples 14, allowing seal functionality to be maintained for extended periods of time.

In the case of an outside-type mechanical seal in which the sealed fluid is to the inside of the rotating ring 3 and the stationary ring 6, a disposition such that part of the interior of the radial direction of the sealed-fluid-accommodating blocks 10 is not covered by the corresponding sealing face of the stationary ring 6 is sufficient.

REFERENCE SIGNS LIST

1 Rotating shaft
2 Sleeve
3 Rotating ring
4 Housing
5 Seal cover
6 Stationary ring
7 Bellows
8 Coiled wave spring
9 Bellows
10 Sealed-fluid-accommodating block
11 Pumping area
11a Intake pumping area
11b Outflow pumping area
12 Outer circumference
13 Seal dam area
14 Dimple
15 Solid lubricant
S Sealing face

The invention claimed is:

1. A sliding parts assembly comprising an annular stationary ring fixed on a fixed side and an annular rotating ring that rotates along with a rotating shaft oppose each other and sealing faces are caused to rotate relative to one another, whereby a sealed fluid present on one side in a radial direction of the relatively rotating sealing faces is sealed;

wherein the sliding parts assembly further comprises:

a plurality of circumferentially separated sealed-fluid-accommodating blocks formed on either of the sealing faces of said stationary ring or rotating ring so as to communicate with a sealed fluid-containing space, said plurality of sealed-fluid-accommodating blocks having an intended shape capable of containing sealed fluid, formed a difference in level with the sealing faces;

pumping areas for generating a pumping action due to the sliding of the stationary ring and the rotating ring in relative rotation are formed on the bottom of said plurality of sealed-fluid-accommodating blocks having a shape capable of containing sealed fluid;

a plurality of parallel linear indentations is formed in each of the pumping areas, an imaginary plane connecting apexes of the indented portions of the pumping areas is set lower than the sealing faces;

the pumping areas formed on the bottom of said plurality of sealed-fluid-accommodating blocks are provided with intake pumping areas operating in a direction so as to draw in the sealed fluid when the sealing faces rotate relatively in a circumferential direction, and outflow pumping areas operating in a direction so as to expel the sealed fluid when the sealing faces rotate relatively in the same circumferential direction;

a plurality of dimples are disposed on a seal dam area on a side of the sealing face on which said sealed-fluid-accommodating blocks are formed, the seal dam area being on an opposite side of the sealing face relative to the sealed-fluid side, and a liquid membrane of thickness H from 0.1 μm to 10 μm is formed between the sealing faces of said stationary ring and said rotating ring, a level difference D1 between the imaginary plane connecting the apexes of the indented portions of the pumping areas and the sealing face is from 0.1H to 10H, a depth D2 between the apexes and troughs of the indentations is from 0.1H to 10H, and a pitch P of the linear indentations of the pumping areas is from 0.1 μm to 100 μm.

2. The sliding parts assembly according to claim 1, wherein said plurality of dimples are disposed so as to be aligned over an circumference centered on a center of the relative rotation of the stationary ring and the rotating ring.

3. The sliding parts assembly according to claim 1, wherein said plurality of dimples are disposed so that discrete pluralities thereof are aligned over each of a plurality of circumferences of different diameters centered on a center of the relative rotation of the stationary ring and the rotating ring.

4. The sliding parts assembly according to claim 1, wherein the plurality of dimples are disposed aligned over an spiral turning in the direction of the relative rotation of the stationary ring and the rotating ring.

5. The sliding parts assembly according to claim 1, wherein said plurality of dimples are provided within a limited area of the seal dam area.

6. The sliding parts assembly according to claim 1, wherein a solid lubricant is embedded within said plurality of dimples.

7. The sliding parts assembly according to claim 6, wherein a solid lubricant is selected from the group consisting of PTFE, $MoS_2$, $WS_2$, graphite, and BN.

8. The sliding parts assembly according to claim 2, wherein said plurality of dimples are provided within a limited area of the seal dam area.

9. The sliding parts assembly according to claim 3, wherein said plurality of dimples are provided within a limited area of the seal dam area.

10. The sliding parts assembly according to claim 4, wherein said plurality of dimples are provided within a limited area of the seal dam area.

11. The sliding parts assembly according to claim 2, wherein a solid lubricant is embedded within said plurality of dimples.

12. The sliding parts assembly according to claim 3, wherein a solid lubricant is embedded within said plurality of dimples.

13. The sliding parts assembly according to claim 4, wherein a solid lubricant is embedded within said plurality of dimples.

14. The sliding parts assembly according to claim 5, wherein a solid lubricant is embedded within said plurality of dimples.

* * * * *